(12) United States Patent
Andoh et al.

(10) Patent No.: US 11,651,895 B2
(45) Date of Patent: May 16, 2023

(54) THIN FILM CAPACITOR

(71) Applicant: TDK Corporation, Tokyo (JP)

(72) Inventors: Suguru Andoh, Tokyo (JP); Hiroshi Takasaki, Tokyo (JP); Hitoshi Saita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/536,319

(22) Filed: Nov. 29, 2021

(65) Prior Publication Data

US 2022/0172894 A1 Jun. 2, 2022

(30) Foreign Application Priority Data

Nov. 30, 2020 (JP) .............................. JP2020-198193

(51) Int. Cl.
*H01G 4/015* (2006.01)
*H01G 4/33* (2006.01)

(52) U.S. Cl.
CPC .............. *H01G 4/015* (2013.01); *H01G 4/33* (2013.01)

(58) Field of Classification Search
CPC ................................................... H01G 4/015
See application file for complete search history.

(56) References Cited

U.S. PATENT DOCUMENTS

| 4,482,931 A | * | 11/1984 | Yializis | H01G 4/008 361/314 |
| 2012/0287554 A1 | * | 11/2012 | Hosking | H01G 4/015 361/301.5 |
| 2017/0047166 A1 | * | 2/2017 | Saito | H01G 4/32 |
| 2019/0237253 A1 | * | 8/2019 | Sano | H01G 4/18 |
| 2019/0348220 A1 | * | 11/2019 | Ichikawa | H01G 4/012 |

FOREIGN PATENT DOCUMENTS

| CN | 108987109 A | * | 12/2018 |
| JP | 2009-094543 A | | 4/2009 |
| JP | 2013-219305 A | | 10/2013 |

\* cited by examiner

*Primary Examiner* — Eric W Thomas
(74) *Attorney, Agent, or Firm* — McDermott Will & Emery LLP

(57) ABSTRACT

Disclosed herein is a thin film capacitor that includes a capacitive insulating film having first and second surfaces opposite to each other, a first capacitive electrode covering the first surface of the capacitive insulating film, and a second capacitive electrode covering the second surface of the capacitive insulating film and including a plurality of capacitor areas divided by a slit and a plurality of fuse areas connecting two of adjacent capacitor areas. The second capacitive electrode has a structure in which a plurality of conductor films including a first conductor film and a second conductor film lower in electrical resistivity than the first conductor film are laminated.

12 Claims, 4 Drawing Sheets

THIN FILM CAPACITOR

BACKGROUND OF THE INVENTION

Field of the Invention

The present invention relates to a thin film capacitor and, more particular, to a thin film capacitor capable of self-repairing a short-circuit defect due to dielectric breakdown of a capacitive insulating film.

Description of Related Art

A power supply circuit board on which a switching element is mounted is mounted with a smoothing or snubber capacitor for stabilizing the power supply voltage by suppressing fluctuation therein, whereby voltage fluctuation generated in the power supply circuit and EMC noise generated therearound in association with the fluctuation are suppressed. As the smoothing or snubber capacitor, a multilayer ceramic capacitor is typically used.

In recent years, size reduction and high-frequency driving of power supply circuits are advancing, and along with this, circuit boards are reduced in size, so that the space for mounting the multilayer ceramic chip capacitor may become insufficient. Thus, in place of the multilayer ceramic chip capacitor, a thin film capacitor capable of being embedded in a circuit board is sometimes used. However, when the thin film capacitor is applied with a high voltage, a capacitive insulating film thereof undergoes dielectric breakdown, which may cause a short-circuit defect.

Although not directly related to the thin-film capacitor, JP 2009-94543A and JP 2013-219305A disclose a film capacitor in which a capacitive electrode is divided into a plurality of areas, and adjacent areas are connected through a fuse area, thus allowing self-repair of a short-circuit defect due to dielectric breakdown of a capacitive insulating film.

However, unlike the film capacitor, the thin-film capacitor, which is embedded in a circuit board, is required to have a reduced ESR (Equivalent Series Resistance) and needs to use a metal material having a low electrical resistivity, such as CU, as the material of the capacitive electrode. Thus, even when the method described in JP 2009-94543A and JP 2013-219305A is applied as it is to the thin-film capacitor, a fuse region made of Cu with a low resistance may not be fused, and self-repair may fail.

SUMMARY

It is therefore an object of the present invention to provide a thin-film capacitor capable of self-repairing a short-circuit defect due to dielectric breakdown of the capacitive insulating film.

A thin film capacitor according to the present invention includes: a capacitive insulating film; a first capacitive electrode covering one surface of the capacitive insulating film; and a second capacitive electrode covering the other surface of the capacitive insulating film and including a plurality of capacitor areas divided by a slit and a plurality of fuse areas connecting two of the adjacent capacitor areas. The second capacitive electrode has a structure in which a plurality of conductor films including a first conductor film and a second conductor film lower in electrical resistivity than the first conductor film are laminated.

According to the present invention, the second capacitive electrode includes the first conductor film having a high electrical resistivity, so that by correspondingly reducing the film thickness of the second conductor film having a low electrical resistivity, the resistance value of the fuse area can be increased. This allows the fuse area to be fused properly at the time of occurrence of a short-circuit defect due to dielectric breakdown.

In the present invention, the conductor width of the second conductor film in the fuse area may be smaller than the conductor width of the first conductor film in the fuse area. This further increases the resistance value of the fuse area, allowing the fuse area to be fused more reliably. In this case, the second capacitive electrode in the fuse area may have a tapered shape in cross section. This allows the conductor width of the second conductor film in the fuse area to be made smaller than the conductor width of the first conductor film by a single pattering process without using a plurality of masks.

In the present invention, the conductor thickness of the second conductor film in the fuse area may be smaller than the conductor thickness of the second conductor film in the capacitor area, or the second conductor film may be selectively removed in the fuse area. This further increases the resistance value of the fuse area, allowing the fuse area to be fused reliably.

In the present invention, the first conductor film may be positioned between the capacitive insulating film and the second conductor film, and the conductor thickness of the second conductor film in the fuse area may be larger than the conductor thickness of the first conductor film in the fuse area. Thus, when the thin film capacitor is embedded in a circuit board, a via conductor provided in the circuit board contacts the second conductor film having a low electrical conductivity, which can suppress an increase in an ESR due to division of the second capacitive electrode into a plurality of capacitor areas.

In the present invention, the second conductor film may be made of Cu. This can improve ESR characteristics.

As described above, according to the present invention, there can be provided a thin-film capacitor capable of self-repairing a short-circuit defect due to dielectric breakdown of the capacitive insulating film.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENTS

Preferred embodiments of the present invention will now be explained in detail with reference to the drawings.

Figure 1:
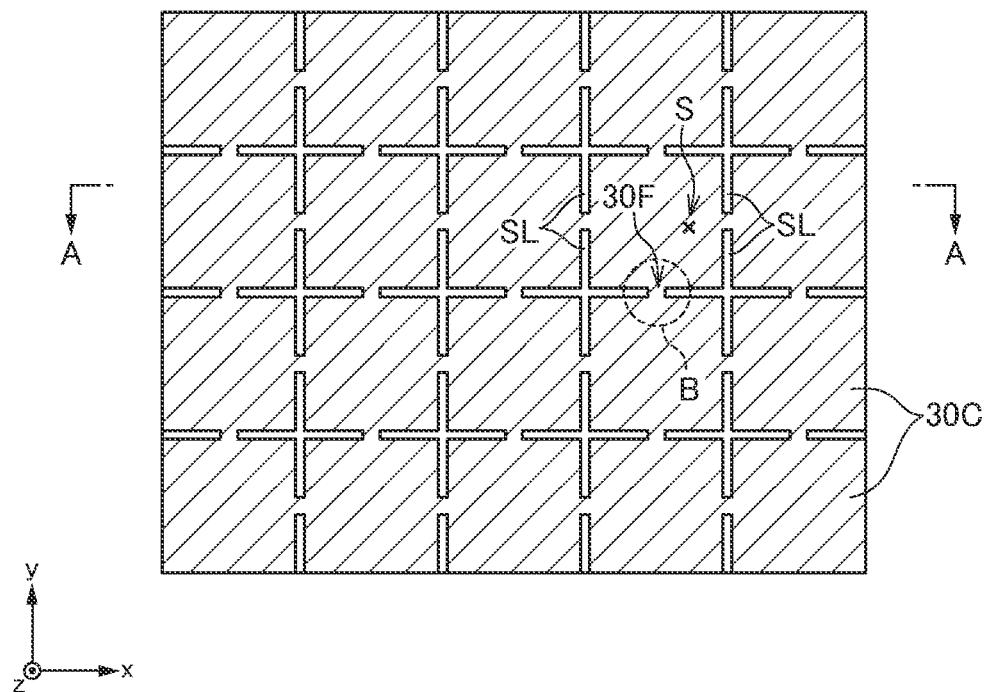
FIG. 1 is a schematic plan view for explaining the structure of a thin film capacitor 1 according to an embodiment of the present invention.
Figure 2:
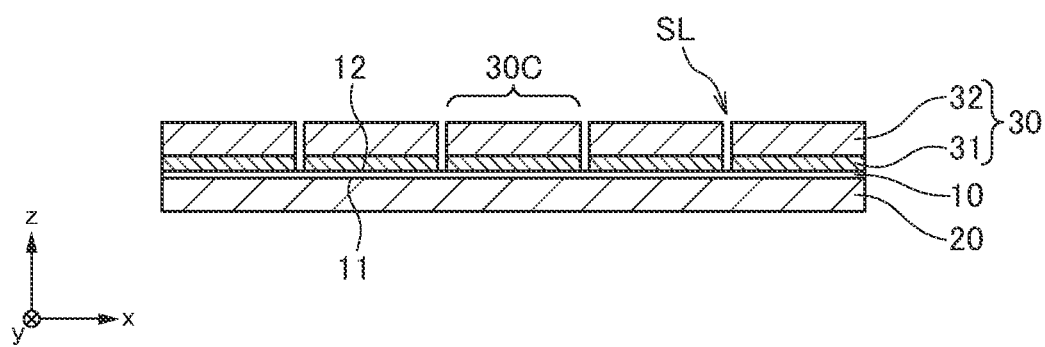
FIG. 2 is an xz cross-sectional view taken along the line A-A in FIG. 1.
Figure 3:
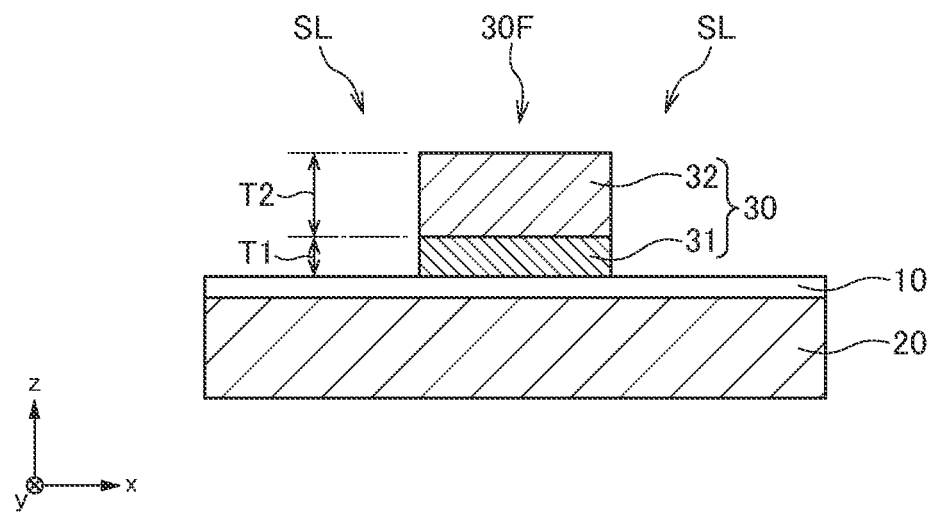
FIG. 3 is an xz cross-sectional view of the area B in FIG. 1.

FIG. 1 is a schematic plan view for explaining the structure of a thin film capacitor 1 according to an embodiment of the present invention. FIG. 2 is an xz cross-sectional view taken along the line A-A in FIG. 1, and FIG. 3 is an xz cross-sectional view of the area B in FIG. 1. FIGS. 5 to 8 to be described later also illustrate the cross section of the area B in FIG. 1.

The thin film capacitor 1 according to the present embodiment is a thin device which is embedded in a circuit board on which a switching element is mounted to be used as a smoothing or snubber capacitor. As illustrated in FIGS. 1 to 3, the thin film capacitor 1 has a capacitive insulating film 10, a lower capacitive electrode 20 covering a lower surface 11 of the capacitive insulating film 10, and an upper capacitive electrode 30 covering an upper surface 12 of the capacitive insulating film 10. The vertical (up and down) direction mentioned here indicates the vertical direction at the time of manufacture, and the mounting direction of the thin film capacitor 1 may desirably be determined. That is, the thin film capacitor may be embedded in a circuit board with the lower capacitive electrode 20 facing upward and the upper capacitive electrode 30 facing downward. As will be described later, the thin film capacitor 1 according to the present embodiment has a function of self-repairing a short-circuit defect due to dielectric breakdown and is thus more suitable for applications in which a higher voltage is applied as compared with common thin film capacitors.

Although the capacitive insulating film 10 is not particularly limited in material and thickness, it can be made of a material with a higher withstand voltage and can have a thickness for ensuring a higher withstand voltage than a capacitive insulating film used in common thin film capacitors. The lower capacitive electrode 20 is also not particularly limited in material and thickness, but Cu having a low electrical resistivity is preferably used as the material of the lower capacitive electrode 20 from the viewpoint of a reduced ESR.

As illustrated in FIG. 1, the upper capacitive electrode 30 is divided into a plurality of capacitor areas 30C by a slit SL. The slit SL is an area where the upper capacitive electrode 30 has been removed, and thus the capacitive insulating film 10 is exposed through the slit SL. The slit SL intermittently extends in the x- and y-directions, whereby two capacitor areas 30C adjacent in x-and y-directions are connected to each other through a fuse area 30F. The fuse area 30F constitutes a part of the upper capacitive electrode 30 positioned in the area where the slit SL is divided.

The upper capacitive electrode 30 does not have a single layer structure but has a multilayer structure in which conductor films 31 and 32 are laminated as illustrated in FIGS. 2 and 3. Although the vertical positional relation between the conductor films 31 and 32 is not particularly limited, the conductor film 31 is positioned in the lower layer so as to contact the capacitive insulating film 10 in the present embodiment. Although the material of the conductor films 31 and 32 is not also particularly limited, at least the electrical resistivity of a conductive material constituting the conductor film 31 needs to be higher than that of a conductive material constituting the conductor film 32. Although not particularly limited, a thickness T2 of the conductor film 32 is larger than a thickness T1 of the conductor film 31, whereby the conductor film 32 occupies a large part of the upper capacitive electrode 30. By using Cu having a low resistance value as the material of the conductor film 32, the ESR can be reduced.

The conductor film 31 has a role of increasing the resistance of the fuse area 30F, and is made of a conductive material having a higher electrical resistivity than the conductive material constituting the conductor film 32, as described above. Thus, when the thickness of the upper capacitive electrode 30 is the same, the resistance value of the fuse area 30F can be increased as compared to when the entire upper capacitive electrode 30 is constituted by the conductor film 32. When the conductor film 32 is made of Cu, the conductor film 31 can be made of Al, W, Mo, Ni, Pt, Fe, Cr, Nb, In, Rh, Co, Pd, Ti, or alloy thereof. When the thickness T1 of the conductor film 31 is too small, the resistance of the fuse area 30F is not substantially increased, so that the thickness T1 is preferably at least 1/500 or more of the thickness T2 of the conductor film 32.

Figure 4:
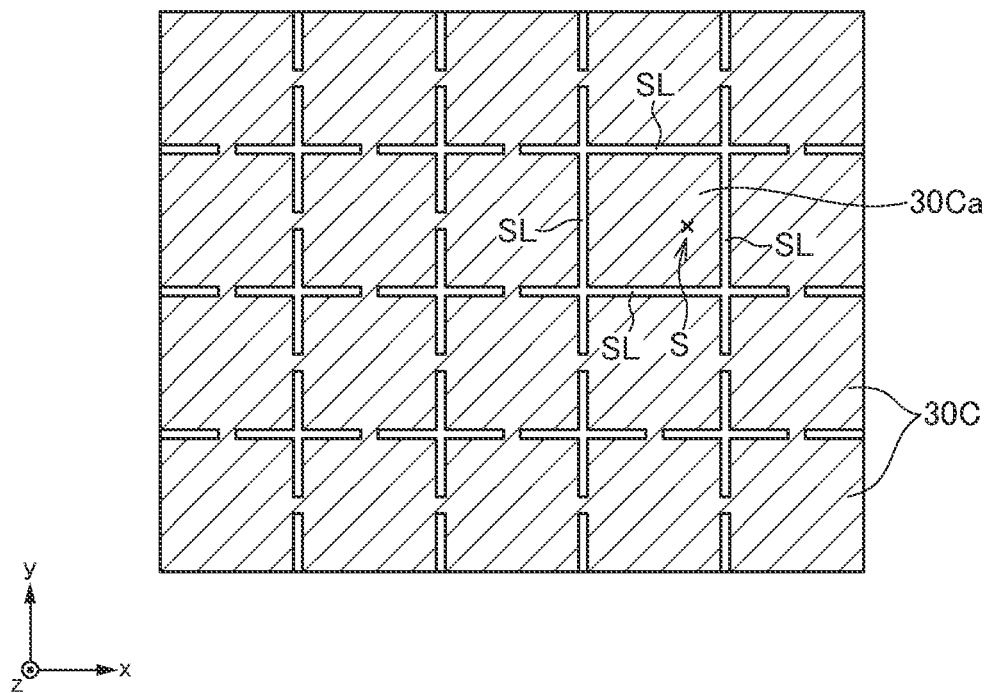
FIG. 4 is a schematic plan view illustrating the structure of the self-repaired thin film capacitor 1.

When, in the actual use of the thus structured thin film capacitor 1, the capacitive insulating film 10 at a position denoted by a symbol S undergoes dielectric breakdown to cause a short-circuit between the lower capacitive electrode 20 and the upper capacitive electrode 30, a large current flows in the capacitor area 30C at the short-circuit position. The large current flows through the fuse area 30F provided in this capacitor area 30C. The conductor width of the upper capacitive electrode 30 at the fuse area 30F is significantly reduced by the slit SL, so that the fuse area 30F is highly heated to be fused. Thus, as illustrated in FIG. 4, a capacitor area 30Ca having the short-circuit defect is electrically isolated from other capacitor areas 30C. As a result, the capacitor area 30Ca having the short-circuit defect no longer functions as a capacitive electrode; however, other capacitor areas 30C normally function, allowing the entire thin film capacitor 1 to be self-repaired.

As described above, in the thin film capacitor 1 according to the present embodiment, the upper capacitive electrode 30 divided by the slit SL is composed of two layers of the conductor films 31 and 32, and the conductor film 31 has a high electrical conductivity, so that the fuse area 30F can be fused more reliably in the event of the occurrence of a short-circuit defect as compared to when the entire upper capacitive electrode 30 is constituted by the conductor film 32. This makes it possible to increase the reliability of the thin film capacitor 1. In addition, the conductor film 31 having a high electrical resistivity is positioned between the capacitive insulating film 10 and the conductor film 32, and the conductor film 32 having a low electrical resistivity constitutes the outermost surface, so that when the thin film capacitor 1 is embedded in a circuit board, a via conductor provided in the circuit board contacts the conductor film 32 having a low electrical conductivity, which suppresses an increase in the ESR due to division of the upper capacitive electrode 30 into the plurality of capacitor areas 30C.

Figure 5:
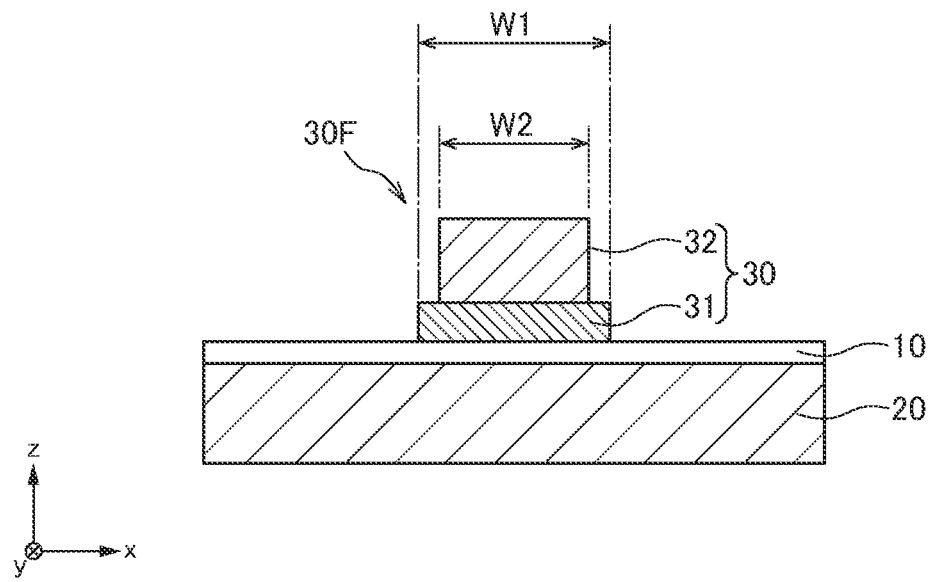
FIG. 5 is an xz cross-sectional view for explaining the shape of the fuse area 30F according to a first modification.

FIG. 5 is an xz cross-sectional view for explaining the shape of the fuse area 30F according to a first modification.

In the example of FIG. 5, a conductor width W2 of the conductor film 32 in the fuse area 30F is smaller than a conductor width W1 of the conductor film 31 in the fuse area 30F. The conductor width (W1 or W2) refers to the width in the x-direction in the xz cross section and the width in the y-direction in the yz cross section, each of which is the width in a direction perpendicular to the direction of current flowing when a short-circuit defect occurs. By thus reducing the conductor width W2 of the conductor film 32 in the fuse area 30F, the resistance value of the fuse area 30F is increased, allowing the fuse area 30F to be fused more reliably in the event of the occurrence of a short-circuit defect. A method of processing the fuse area 30F into the shape illustrated in FIG. 5 includes pattering the conductor films 31 and 32 using different masks and patterning using a single mask at a higher etching rate for the conductor film 32 than for the conductor film 31.

Figure 6:
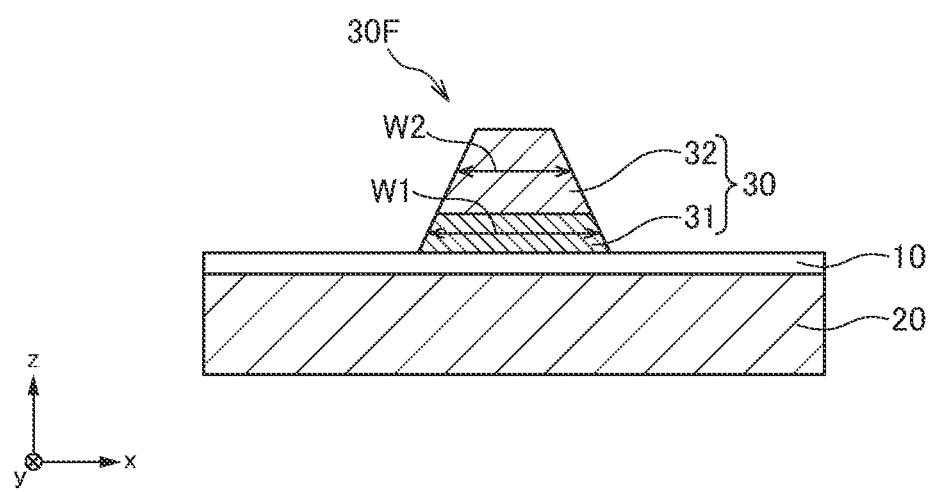
FIG. 6 is an xz cross-sectional view for explaining the shape of the fuse area 30F according to a second modification.

FIG. 6 is an xz cross-sectional view for explaining the shape of the fuse area 30F according to a second modification.

In the example of FIG. 6, the conductor films 31 and 32 in the fuse area 30F each have a tapered shape in cross section. That is, the conductor width of the upper capacitive electrode 30 in the fuse area 30F is gradually reduced from the lower surface of the conductor film 31 contacting the capacitive insulating film 10 toward the top surface of the conductor film 32. This can make the conductor width W2 smaller than the conductor width W1. When the conductor films 31 and 32 in the fuse area 30F each have a tapered shape in cross section, the conductor widths W1 and W2 are defined by the widths at the middle positions of the respective conductor films 31 and 32 in the thickness direction. A method of processing the fuse area 30F into the shape illustrated in FIG. 6 includes patterning using a single mask under highly isotropic etching conditions.

Figure 7:
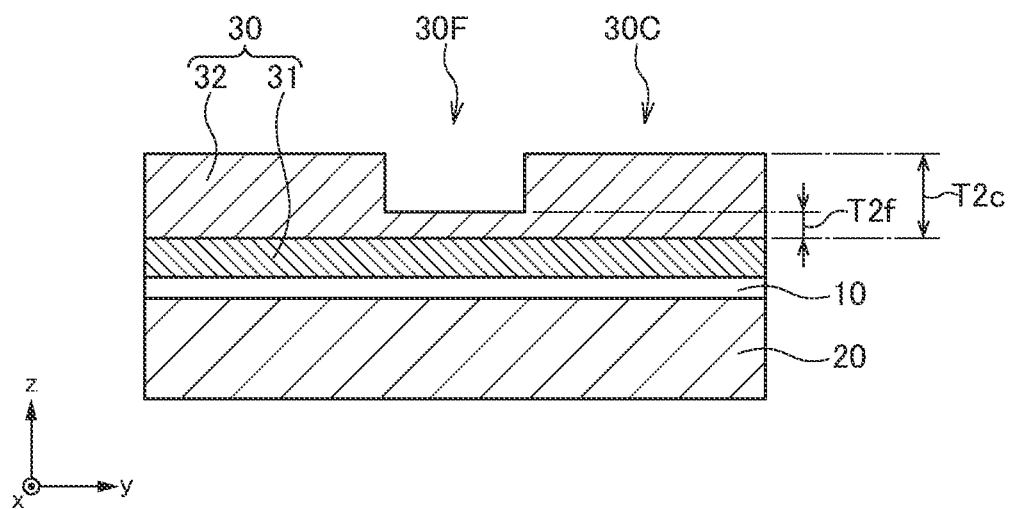
FIG. 7 is a yz cross-sectional view for explaining the shape of the fuse area 30F according to a third modification.

FIG. 7 is a yz cross-sectional view for explaining the shape of the fuse area 30F according to a third modification.

In the example of FIG. 7, a conductor thickness T2$f$ of the conductor film 32 in the fuse area 30F is smaller than a conductor thickness T2$c$ of the conductor film 32 in the capacitor area 30C. This can increase the resistance value of the fuse area 30F, making it possible to fuse the fuse area 30F reliably in the event of the occurrence of a short-circuit defect.

Figure 8A:
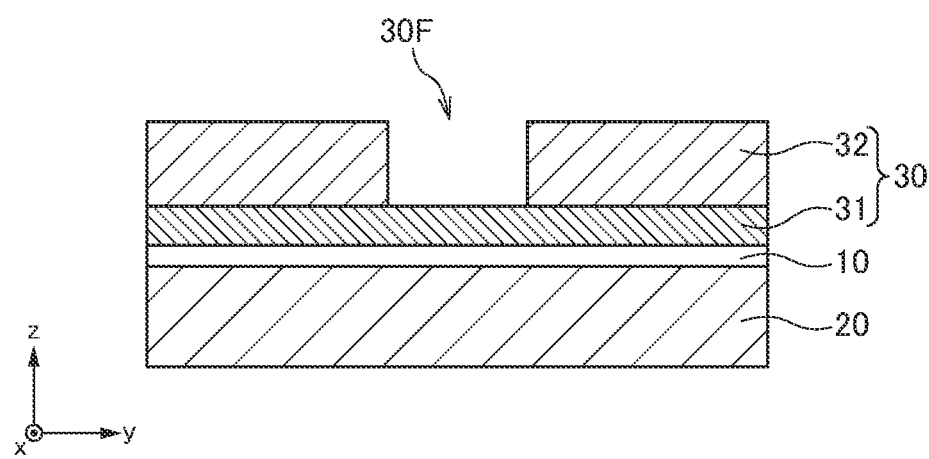
FIGS. 8A and 8B are respectively a yz cross-sectional view and an xz cross-sectional view for explaining the shape of the fuse area 30F according to a fourth modification.
Figure 8B:
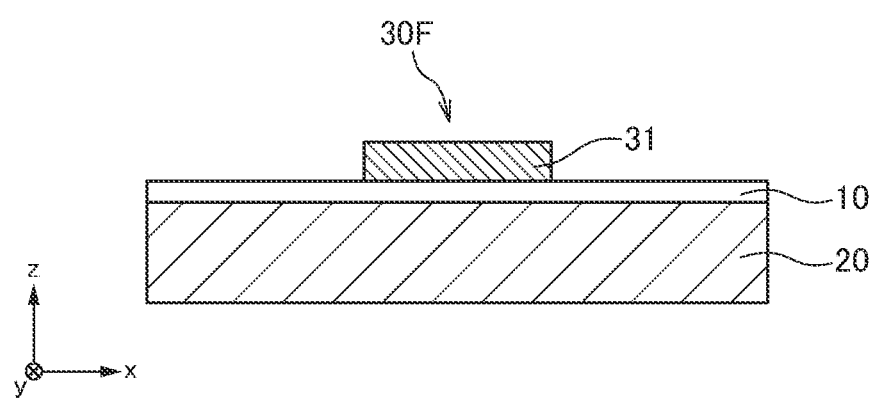

FIGS. 8A and 8B are respectively a yz cross-sectional view and an xz cross-sectional view for explaining the shape of the fuse area 30F according to a fourth modification.

In the example of FIGS. 8A and 8B, the conductor film 32 is selectively removed in the fuse area 30F. This can further increase the resistance value of the fuse area 30F, making it possible to fuse the fuse area 30F more reliably in the event of the occurrence of a short-circuit defect.

While the preferred embodiment of the present invention has been described, the present invention is not limited to the above embodiment, and various modifications may be made within the scope of the present invention, and all such modifications are included in the present invention.

For example, although the upper capacitive electrode 30 has a structure including two layers of the conductor films 31 and 32 in the above embodiment, it may include three or more layers of conductor films.

What is claimed is:

1. A thin film capacitor comprising:
   a capacitive insulating film having first and second surfaces opposite to each other;
   a first capacitive electrode covering the first surface of the capacitive insulating film; and
   a second capacitive electrode covering the second surface of the capacitive insulating film and including a plurality of capacitor areas divided by a slit and a plurality of fuse areas connecting two of adjacent capacitor areas,
   wherein the second capacitive electrode has a structure in which a plurality of conductor films including a first conductor film and a second conductor film lower in electrical resistivity than the first conductor film are laminated, and
   wherein a conductor width of the second conductor film in the fuse areas is smaller than a conductor width of the first conductor film in the fuse areas.

2. The thin film capacitor as claimed in claim 1, wherein the second capacitive electrode in the fuse areas has a tapered shape in cross section.

3. The thin film capacitor as claimed in claim 1,
   wherein the first conductor film is positioned between the capacitive insulating film and the second conductor film, and
   wherein a conductor thickness of the second conductor film in the fuse areas is larger than a conductor thickness of the first conductor film in the fuse areas.

4. The thin film capacitor as claimed in claim 1, wherein the second conductor film comprises Cu.

5. A thin film capacitor comprising:
   a capacitive insulating film having first and second surfaces opposite to each other;
   a first capacitive electrode covering the first surface of the capacitive insulating film; and
   a second capacitive electrode covering the second surface of the capacitive insulating film and including a plurality of capacitor areas divided by a slit and a plurality of fuse areas connecting two of adjacent capacitor areas,
   wherein the second capacitive electrode has a structure in which a plurality of conductor films including a first conductor film and a second conductor film lower in electrical resistivity than the first conductor film are laminated, and
   wherein a conductor thickness of the second conductor film in the fuse areas is smaller than a conductor thickness of the second conductor film in the capacitor area.

6. The thin film capacitor as claimed in claim 5, wherein the second capacitive electrode in the fuse areas has a tapered shape in cross section.

7. The thin film capacitor as claimed in claim 5,
   wherein the first conductor film is positioned between the capacitive insulating film and the second conductor film, and
   wherein a conductor thickness of the second conductor film in the fuse areas is larger than a conductor thickness of the first conductor film in the fuse areas.

8. The thin film capacitor as claimed in claim 5, wherein the second conductor film comprises Cu.

9. A thin film capacitor comprising:
   a capacitive insulating film having first and second surfaces opposite to each other;
   a first capacitive electrode covering the first surface of the capacitive insulating film; and
   a second capacitive electrode covering the second surface of the capacitive insulating film and including a plurality of capacitor areas divided by a slit and a plurality of fuse areas connecting two of adjacent capacitor areas,
   wherein the second capacitive electrode has a structure in which a plurality of conductor films including a first conductor film and a second conductor film lower in electrical resistivity than the first conductor film are laminated, and
   wherein the second conductor film is selectively removed in the fuse areas.

10. The thin film capacitor as claimed in claim 9, wherein the second capacitive electrode in the fuse areas has a tapered shape in cross section.

11. The thin film capacitor as claimed in claim 9,
wherein the first conductor film is positioned between the capacitive insulating film and the second conductor film, and
wherein a conductor thickness of the second conductor film in the fuse areas is larger than a conductor thickness of the first conductor film in the fuse areas.

12. The thin film capacitor as claimed in claim 9, wherein the second conductor film comprises Cu.

* * * * *